(12) United States Patent
Gallione et al.

(10) Patent No.: US 12,429,320 B1
(45) Date of Patent: Sep. 30, 2025

(54) NON-NUMERICAL MEASURING DEVICE AND SYSTEM

(71) Applicants: James Thomas Gallione, Washington, NJ (US); John Phillip Scanlan, Bethlehem, PA (US)

(72) Inventors: James Thomas Gallione, Washington, NJ (US); John Phillip Scanlan, Bethlehem, PA (US)

(*) Notice: Subject to any disclaimer, the term of this patent is extended or adjusted under 35 U.S.C. 154(b) by 0 days.

(21) Appl. No.: 18/617,189

(22) Filed: Mar. 26, 2024

(51) Int. Cl.
| | | |
|---|---|---|
| *G01B 3/1003* | (2020.01) | |
| *A63B 71/06* | (2006.01) | |
| *G01B 3/1046* | (2020.01) | |
| *G01B 3/1071* | (2020.01) | |

(52) U.S. Cl.
CPC ............ *G01B 3/1003* (2020.01); *A63B 71/06* (2013.01); *G01B 3/1046* (2020.01); *A63B 2071/0694* (2013.01); *G01B 2003/1074* (2013.01)

(58) Field of Classification Search
CPC ............... G01B 3/1003; G01B 3/1046; G01B 2003/1074; A63B 71/06; A63B 2071/0694
See application file for complete search history.

(56) References Cited

U.S. PATENT DOCUMENTS

| | | | | |
|---|---|---|---|---|
| 1,240,498 A | * | 9/1917 | Sherwood ................ | G01B 3/56 33/493 |
| 3,086,705 A | * | 4/1963 | Allen, Jr. ................ | F41G 11/00 33/227 |
| 3,253,337 A | * | 5/1966 | Ebert .................... | A01K 91/20 33/1 LE |
| 4,160,324 A | * | 7/1979 | Dunn .................... | A63C 19/06 33/759 |
| 4,766,673 A | * | 8/1988 | Bolson ................. | G01B 3/1041 33/760 |
| 5,280,921 A | * | 1/1994 | Milburn .................. | G01B 3/11 33/759 |
| 5,371,949 A | * | 12/1994 | Delaurier ............. | A63C 19/065 33/1 G |
| 5,556,090 A | | 9/1996 | Coleman | |

(Continued)

FOREIGN PATENT DOCUMENTS

| | | |
|---|---|---|
| CN | 101266124 A | 9/2008 |
| ES | 1217210 U | 9/2018 |

(Continued)

OTHER PUBLICATIONS

"The Regulator: The World's First Attachable, Self-Retracting, Cornhole Measuring Device. (no drilling required)", Web page <https://www.cornholeregulator.com/>, retrieved on Mar. 18, 2024.

(Continued)

*Primary Examiner* — Yaritza Guadalupe-McCall
(74) *Attorney, Agent, or Firm* — Rita C. Chipperson; Chipperson Law Group, P.C.

(57) ABSTRACT

A measuring device includes at least one mark that indicates a defined distance for at least one game component of at least one game. The measuring device further includes at least one game indicia, wherein the game indicia identifies the at least one game and at least one component indicia, wherein the game component indicia identifies the at least one game component of the least one game. The measuring device may be extended from and retracted into a housing assembly.

16 Claims, 7 Drawing Sheets

(56) References Cited

U.S. PATENT DOCUMENTS

| | | | | |
|---|---|---|---|---|
| 6,217,077 B1* | 4/2001 | Priebe | ............... | G01B 3/02 283/117 |
| 6,429,391 B1 | 8/2002 | Gruver | | |
| 6,754,974 B2 | 6/2004 | Bassolino et al. | | |
| 6,889,444 B2* | 5/2005 | Trout | ............... | G01B 3/12 33/780 |
| 6,893,365 B2* | 5/2005 | Rathbun | ............ | A63B 69/0002 33/1 G |
| 6,928,029 B2* | 8/2005 | Rickman | ............ | G01S 17/86 33/760 |
| 7,093,834 B1* | 8/2006 | Gilley | ............... | A63B 69/0002 273/317 |
| 7,231,722 B2* | 6/2007 | Hickey | ............... | B44D 3/38 33/1 LE |
| 7,343,694 B2 | 3/2008 | Erdfarb | | |
| 7,984,562 B2* | 7/2011 | Redmond | ............ | G01B 5/0023 33/1 G |
| 8,356,418 B1* | 1/2013 | Hall | ............... | G01B 3/1056 33/701 |
| 8,405,485 B2* | 3/2013 | Barker | ............... | G01C 15/004 340/8.1 |
| 8,590,170 B2* | 11/2013 | Wagner | ............ | G01B 3/1041 33/760 |
| 9,829,299 B1* | 11/2017 | Bennett | ............ | G01B 21/16 |
| 10,682,568 B2* | 6/2020 | Hanson | ............ | A63B 67/068 |
| 10,835,794 B1 | 11/2020 | Mcmahon | | |
| 11,692,802 B2* | 7/2023 | Rizvi | ............... | G01B 3/1007 33/770 |
| 11,719,538 B2* | 8/2023 | Tecu | ............... | A63C 19/065 33/293 |
| 2003/0014878 A1* | 1/2003 | Smith | ............... | A63B 61/04 33/759 |
| 2004/0029655 A1* | 2/2004 | Rathbun | ............ | A63B 69/0002 473/500 |
| 2005/0221922 A1* | 10/2005 | Rathbun | ............ | A63B 69/0002 473/500 |
| 2006/0010705 A1* | 1/2006 | Dettellis | ............ | G01B 3/11 33/756 |
| 2007/0266583 A1* | 11/2007 | Furrow | ............ | G01B 3/1056 33/648 |
| 2008/0216337 A1* | 9/2008 | Chen | ............... | G01B 3/1003 33/759 |
| 2008/0242452 A1 | 10/2008 | Brennan | | |
| 2008/0305893 A1* | 12/2008 | Repko, Jr. | ............ | A63B 69/0002 473/451 |
| 2010/0180459 A1* | 7/2010 | Redmond | ............ | G01B 5/0023 33/562 |
| 2011/0090051 A1* | 4/2011 | Barker | ............... | G01C 15/004 340/8.1 |
| 2011/0232119 A1* | 9/2011 | Smalls | ............... | G01B 3/1041 33/771 |
| 2012/0017486 A1* | 1/2012 | Jones | ............... | G01B 3/04 42/120 |
| 2013/0330695 A1* | 12/2013 | Antevy | ............... | G09B 23/28 434/262 |
| 2015/0321060 A1 | 11/2015 | Nuessle | | |
| 2022/0120549 A1* | 4/2022 | Rizvi | ............... | G01B 3/1089 |
| 2022/0233945 A1* | 7/2022 | Ridley | ............... | A63B 67/06 |
| 2023/0107900 A1* | 4/2023 | Tecu | ............... | G01C 15/06 33/293 |
| 2023/0157419 A1* | 5/2023 | Waldrum | ............ | G01B 3/004 33/3 A |
| 2023/0314115 A1* | 10/2023 | Rizvi | ............... | G01B 3/1089 33/770 |
| 2024/0149140 A1* | 5/2024 | Tan | ............... | A63B 71/0672 |

FOREIGN PATENT DOCUMENTS

| | | | | |
|---|---|---|---|---|
| FR | 2682755 | A1 | | 4/1993 |
| FR | 3085595 | A1 * | 3/2020 | ............ A63B 61/00 |
| JP | 1986134349 | U | | 8/1986 |
| JP | 2002248197 | A * | 9/2002 | |
| TW | 200835903 | A | | 9/2008 |

OTHER PUBLICATIONS

"Board Measuring Cable Wire", Web page <https://kingsthrown.com/products/board-measuring-cable-wire-amazing>, retrieved on Mar. 18, 2024.

* cited by examiner

NON-NUMERICAL MEASURING DEVICE AND SYSTEM

COPYRIGHT NOTICE

A portion of the disclosure of this patent document contains material which is or may be subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Oftentimes game participants challenge each other in skills and coordination at events and parties through the course of a wide variety of games. Such games have individual rules and regulations which outline the dimensions and placements of relevant components of the games. These dimensions are known to be complicated and are not usually immediately identifiable amongst participants when setting up each game. Current measuring systems or devices, such as rulers or measuring tapes, require participants to determine the correct dimensions and format of each individual game, keep a record of the measured numerical values, and then mark the court or playing field. Typically, the process of looking up the regulation dimensions for multiple components for each game can be cumbersome, time consuming, and inaccurate, which is a process made even more bothersome if and when participants choose to play different games that require different set ups.

BRIEF SUMMARY OF THE INVENTION

Briefly stated, in one aspect, a non-numerical measuring device is provided. The measuring device includes a mark, non-numerical game indicia, and non-numerical game component indicia of a singular game.

In another aspect, a non-numerical measuring device includes a plurality of marks, non-numerical game indicia, and non-numerical game component indicia of a plurality of games.

In another aspect, a measuring system is provided. The measuring system includes the measuring device and a housing assembly. The housing assembly includes the measuring component, wherein the measuring component includes a plurality of marks and non-numerical indicia, said non-numerical indicia identifying the games and game components.

In another aspect, a non-numerical measuring system further comprised with a housing assembly and docking clip is provided.

BRIEF DESCRIPTION OF THE SEVERAL VIEWS OF THE DRAWINGS

The foregoing summary, as well as the following detailed description will be better understood when read in conjunction with the appended drawings. For the purpose of illustrating one or more embodiments, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
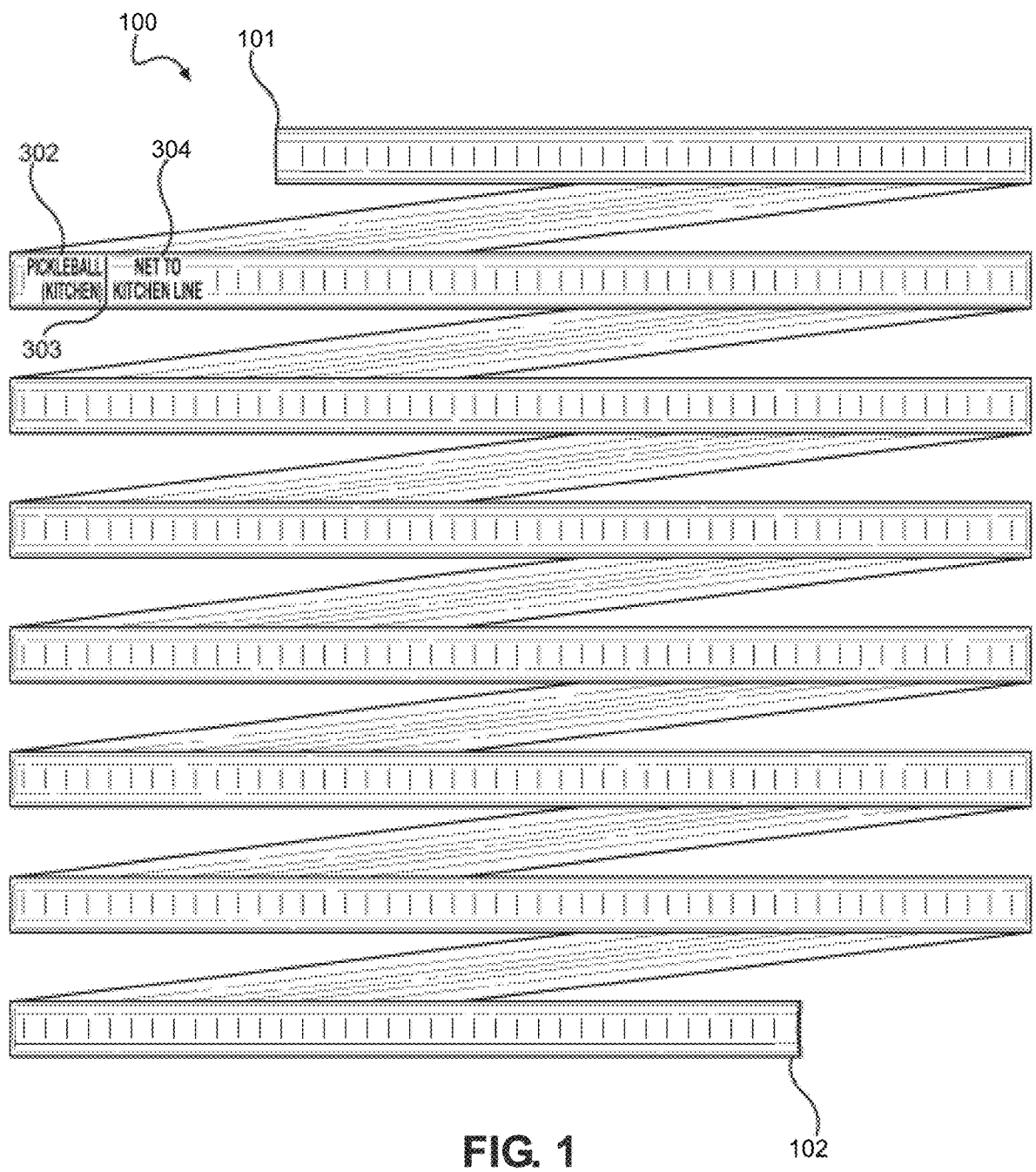
FIG. 1 illustrates an aerial view of a measuring device with non-numerical indicia for one game in accordance with one embodiment.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a measuring device" may include a plurality of measuring devices. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Embodiments described herein generally relate to non-numerical game measuring devices and methods for using the same. More specifically, embodiments relate to non-numerical game measuring devices and methods for using the same in which users may accurately and quickly set up the layout and components of multiple games according to each game's rules and regulations using the measuring device's non-numerical markings without the need to reference game rules and regulations.

Referring now to FIG. 1, depicted is an exemplary embodiment of a measuring device 100, in which the measuring device 100 is an elongated strip or tape having a first end 101 and a second end 102. In this embodiment, the measuring device 100 has a relatively rectangular shape with a relatively longer length l than width w (e.g., l>w), though the measuring device 100 may have other varying lengths, widths, and shapes. The measuring device 100 may include a plastic material, metallic material, fabric and/or other types of materials or combinations thereof.

The measuring device 100 is imprinted with non-numerical game indicia 302, a mark 303, and non-numerical game component indicia 304. The non-numerical game indicia 302 indicates a predetermined game, sport, type of court, portion of a court, etc. The mark 303 may include a physical marking, indentation, partial slit, protuberance, or other indication on the measuring device 100. The non-numerical game component indicia 304 may define a distance associated with the non-numerical game indicia 302, e.g., wherein the defined distance is described in official rules or regulations associated with the predetermined game. The non-numerical game component indicia 304 may include a description of the defined distance associated with the non-numerical game indicia 302, for example, the distance between sidelines, boundaries, goal posts, playing areas, platforms, or other defined components or areas of a court or game.

In one example, users may align the first end 101 of the measuring device 100 to a point on a playing area, and then extend the measuring device 100 up to the mark 303 to establish the defined distance of the game, in this case, the defined distance from a net to a kitchen/non-volley zone boundary of the game of pickleball, thereby eliminating the need to research the exact distance needed to define the predetermined distance of the playing area and to measure the distance. Users may thus use the mark 303 on the measuring device 100 in this example to accurately and quickly determine the defined distance from a net to draw the kitchen line in a game of pickleball.

Figure 2:
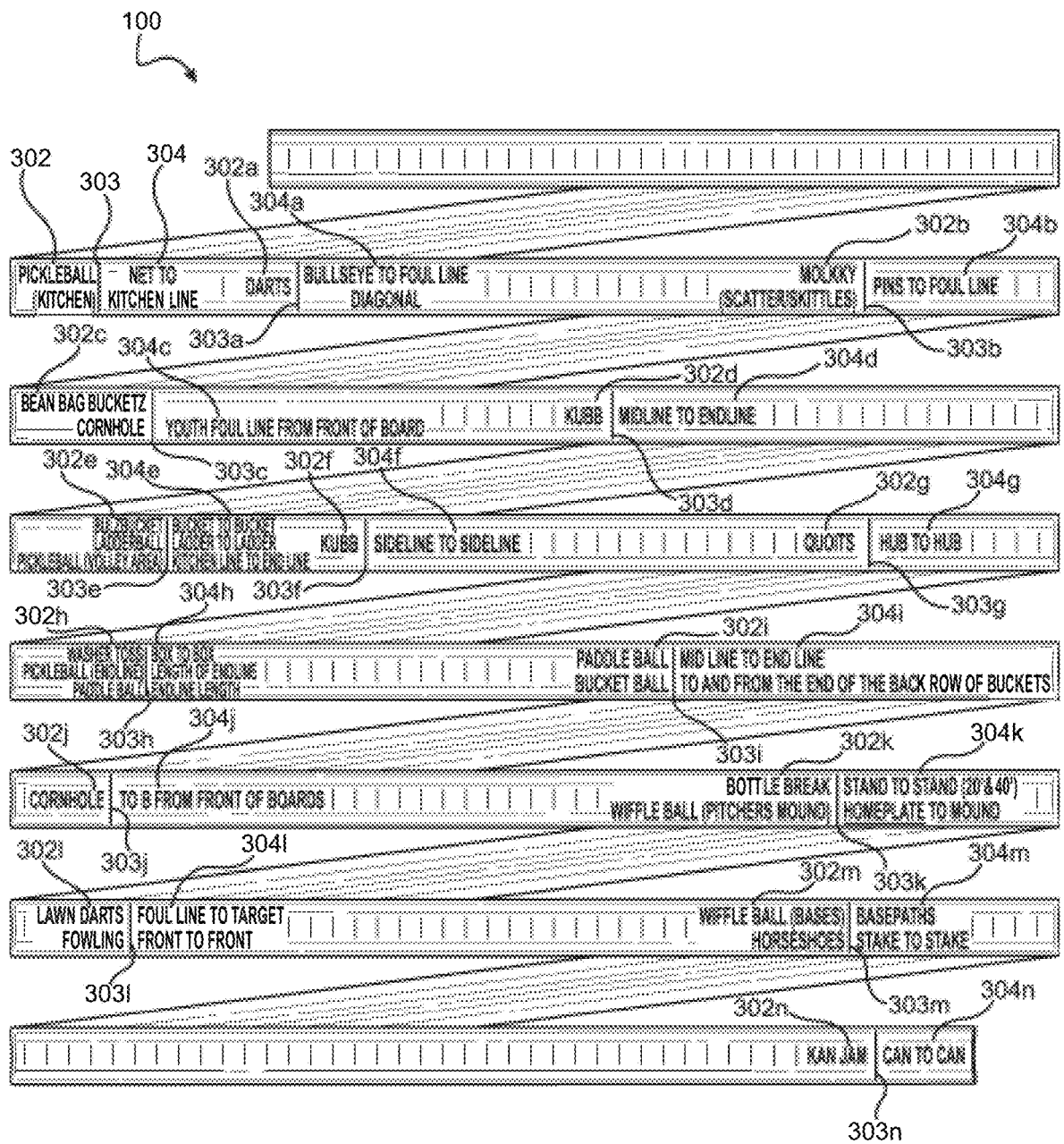
FIG. 2 illustrates an aerial view of a measuring device with non-numerical indicia of a plurality of games in accordance with one embodiment.

Referring now to FIG. 2, in this embodiment of the measuring device 100, the measuring device 100 has a plurality of non-numerical game indicia 302*a-n*, marks 303*a-n*, and non-numerical game component indicia 304*a-n* for a plurality of different games including, but not limited to, pickleball, darts, molkky, bean bag bucketz, kubb, bulzibucket, ladderball, quoits, washer toss, paddleball, bucket ball, cornhole, cornhole junior, bottle break, wiffle ball, lawn darts, fowling, horseshoes, and kan jam. For example, the measuring device 100 may include non-numerical game indicia 302*a* for the game of darts with a mark 303*a* that indicates the defined distance for the non-numerical game component indicia 304*a* of the bullseye to foul line diagonal. In another example, the measuring device 100 may also include non-numerical game indicia 302*b* for the game of molkky with a mark 303*b* that indicates the defined distance between the pins to the foul line, as indicated by the non-numerical game component indicia 304*b*. As seen in FIG. 2, the measuring device 100 includes other marks 303*a-n* that indicate the defined distance between other components, as indicated by the non-numerical game component indicia 304*a-p*.

Figure 3:
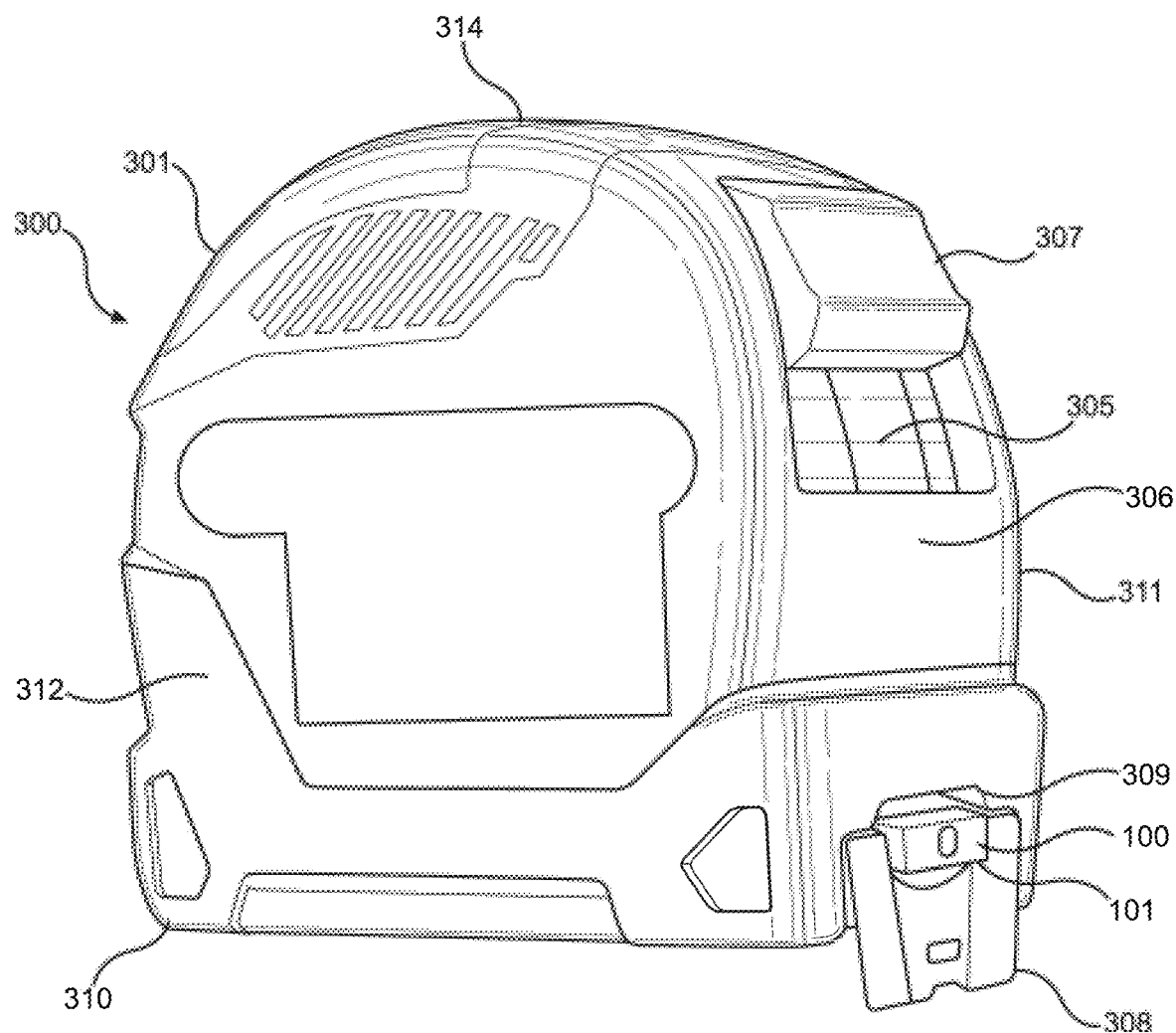
FIG. 3 illustrates a lateral view of a measuring system in accordance with one embodiment.
Figure 4:
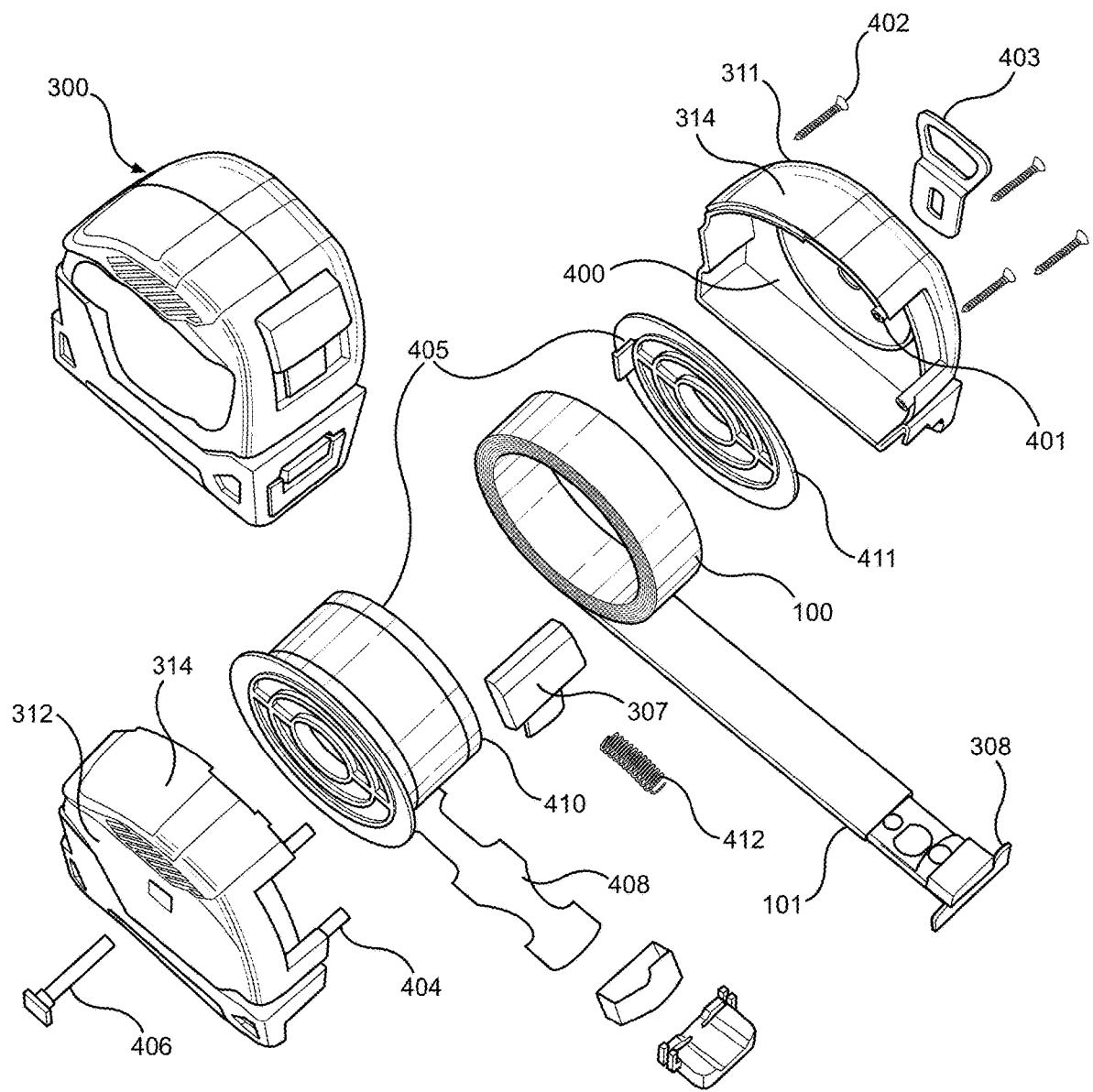
FIG. 4 illustrates an exploded view of a measuring system in accordance with one embodiment.

Referring now to FIG. 3, depicted is an exemplary embodiment of a measuring system 300, in which the measuring device 100 is positioned within a housing assembly 301 in a retracted state. The housing assembly 301 includes a first side wall 312, a second side wall 311, and a peripheral wall 314 connecting the first side wall 312 to the second side wall 311. The first side wall 312, second side wall 311, and peripheral side wall 314 define an internal cavity 400 (as depicted in FIG. 4). Each of the first side wall 312 and second side wall 311 has a substantially circular profile, but in other embodiments, the side walls may be any other desired shape. Portions of the housing assembly 301 may be co-molded or separately formed of natural or synthetic materials, including, but not limited to, metal, rubber, or plastic.

A slot 305 is defined along a forward portion 306 of the peripheral wall 314. The slot 305 is provided to allow for sliding movement of a measuring system lock 307 relative to the housing assembly 301. The lock 307 is provided to selectively engage the measuring device 100 such that an extended section of the measuring device 100 remains at a desired length. A lateral projection or hook 308 is attached to the first end 101 of the measuring device 100, and the measuring device 100 is extendable via the housing assembly port 309 on the peripheral wall 314. The housing assembly port 309 allows for retraction and extension of the measuring device 100 to and from the internal cavity 400 (FIG. 4).

Aspects of the housing assembly 301 may be comprised of natural or synthetic materials, such as rubber, plastic, or other resilient material, and any combination thereof. In the illustrated embodiment, the housing assembly 301 is formed with a support leg 310 which extends from a lower portion of the peripheral wall 314.

Referring now to FIG. 4, depicted is an exploded view of an exemplary embodiment of the measuring system 300. The second side wall 311 includes one or more apertures 401 for receiving one or more fasteners 402 (e.g., screw, bolt, etc.) for coupling the second side wall 311 to the first side wall 312, e.g., via corresponding one or more mounting bosses 404. The first side wall 312 and second side wall 311 may be coupled by one or a plurality of apertures 401 and fasteners 402.

In an embodiment, a bottle opener 403 may be fixed or attachable to the housing assembly 301 via fasteners, screws, bolts, or any combination thereof. Other embodiments may also include a fixed or attachable belt clip, mounting device, or score keeper, or any combinations thereof.

The measuring device 100 is retractable and extendable from the housing assembly 301. The measuring device 100 may be spooled, rotatably disposed or otherwise positioned within the housing assembly 301. In this embodiment, the measuring device 100 is attached to a spool 405 via a connector 408. The spool 405 is rotatably mounted to a shaft, shown as an axle or post 406 that penetrates the housing assembly 301. The spool 405 has a first part 410 and a second part 411, but in other embodiments, the spool 405 may be of one preformed as a singular part. A retraction mechanism is coupled to the spool 405 to provide for powered retraction of the measuring device 100. The retraction mechanism may include, but is not limited to, a coiled spring 412 for motive force. The coiled spring 412 may be constructed from hardened carbon steel to help ensure smooth pulling of the tape.

Figure 5:
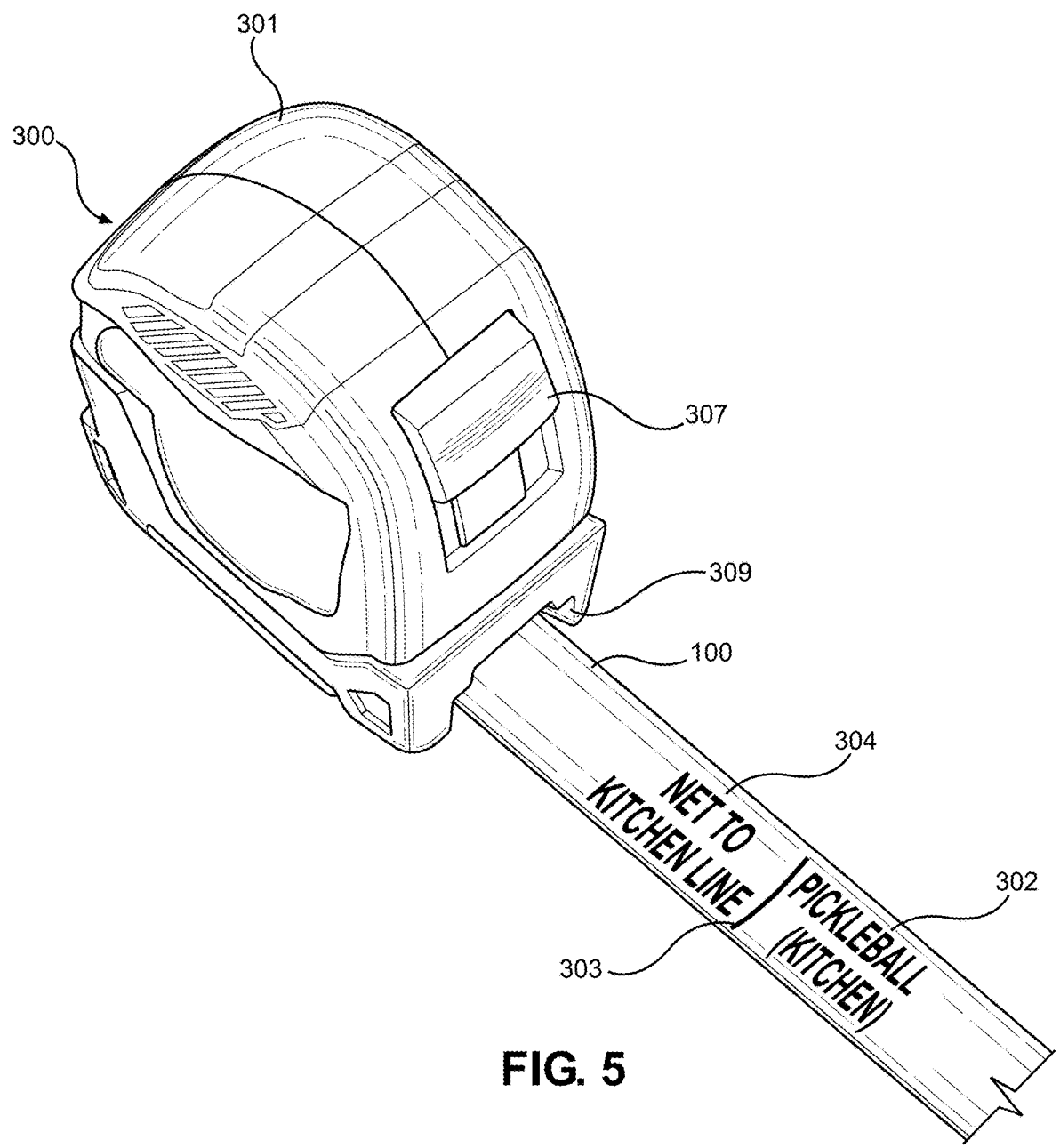
FIG. 5 illustrates an angled perspective view of a measuring system in which the measuring component is extended, depicting non-numerical indicia in accordance with one embodiment.

Referring now to FIG. 5, in the exemplary embodiment, the measuring system 300 shows the measuring device 100 in an extended state, wherein at least a portion of the measuring device 100 extends from the housing assembly 301 via the housing assembly port 309. The measuring device 100 is an elongate strip of material (e.g., metal, plastic, cloth, etc.). The measuring device 100 may have a concave/convex profile that improves rigidity when extended from the housing assembly 301.

The measuring device 100 is imprinted with the non-numerical game indicia 302, a mark 303, and non-numerical game component indicia 304. The embodiment shown in FIG. 5 depicts the non-numerical game indicia 302 indicating the sport of pickleball, and in particular, the kitchen area of a pickleball court. The non-numerical game component indicia 304 indicates the defined distance of the pickleball net to the kitchen line of a pickleball court, as specified in the official rules for pickleball. Users may thus use the mark 303 on the measuring device 100 in this example to accurately and quickly determine the defined distance from a net to the kitchen line without referring to the official rules for pickleball.

For example, in use, the first end 101 of the measuring device 100 may be positioned at a net and the measuring device 100 extended to at least the mark 303. The kitchen line may then be drawn at the distance indicated by the mark 303. The user may thus quickly and easily determine the positioning of the kitchen line from the net, without referring to the official rules or regulations for pickleball. The measuring device 100 may include further measurements for a pickleball court and may also include measurements for other games.

Figure 6:
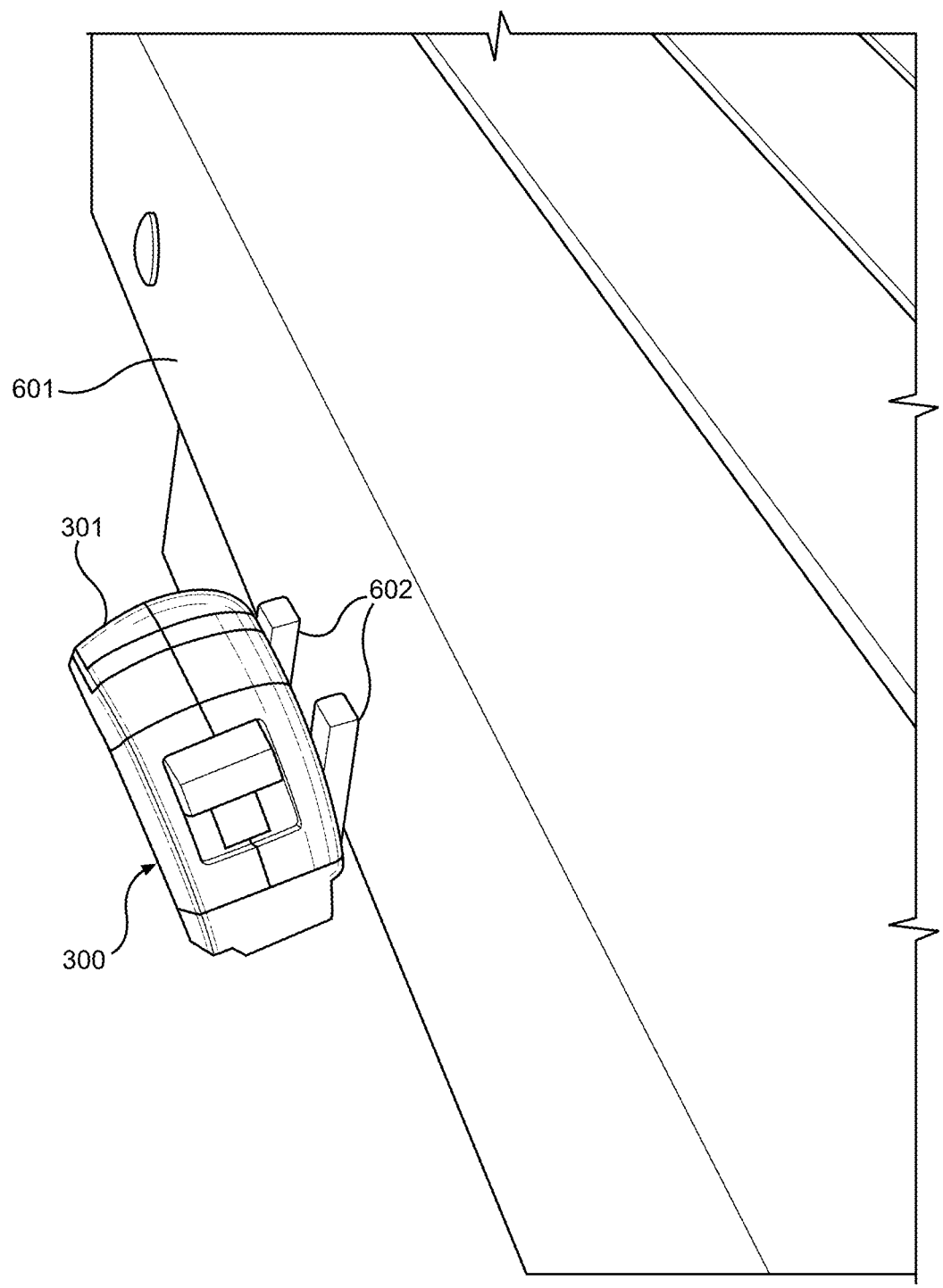
FIG. 6 illustrates a measuring system attached to a game platform via the attachable docking clip in accordance with one embodiment.

Referring now to FIG. 6, in the exemplary embodiment, the measuring system 300 is attached to one cornhole platform 601 via an attachable mounting component 602. The attachable mounting component 602 may be fixed or attached to the housing assembly 301 via fasteners, screws, bolts, or any combination thereof. Example mounting components 602 may include, but are not limited to, clips or clamps.

Figure 7:
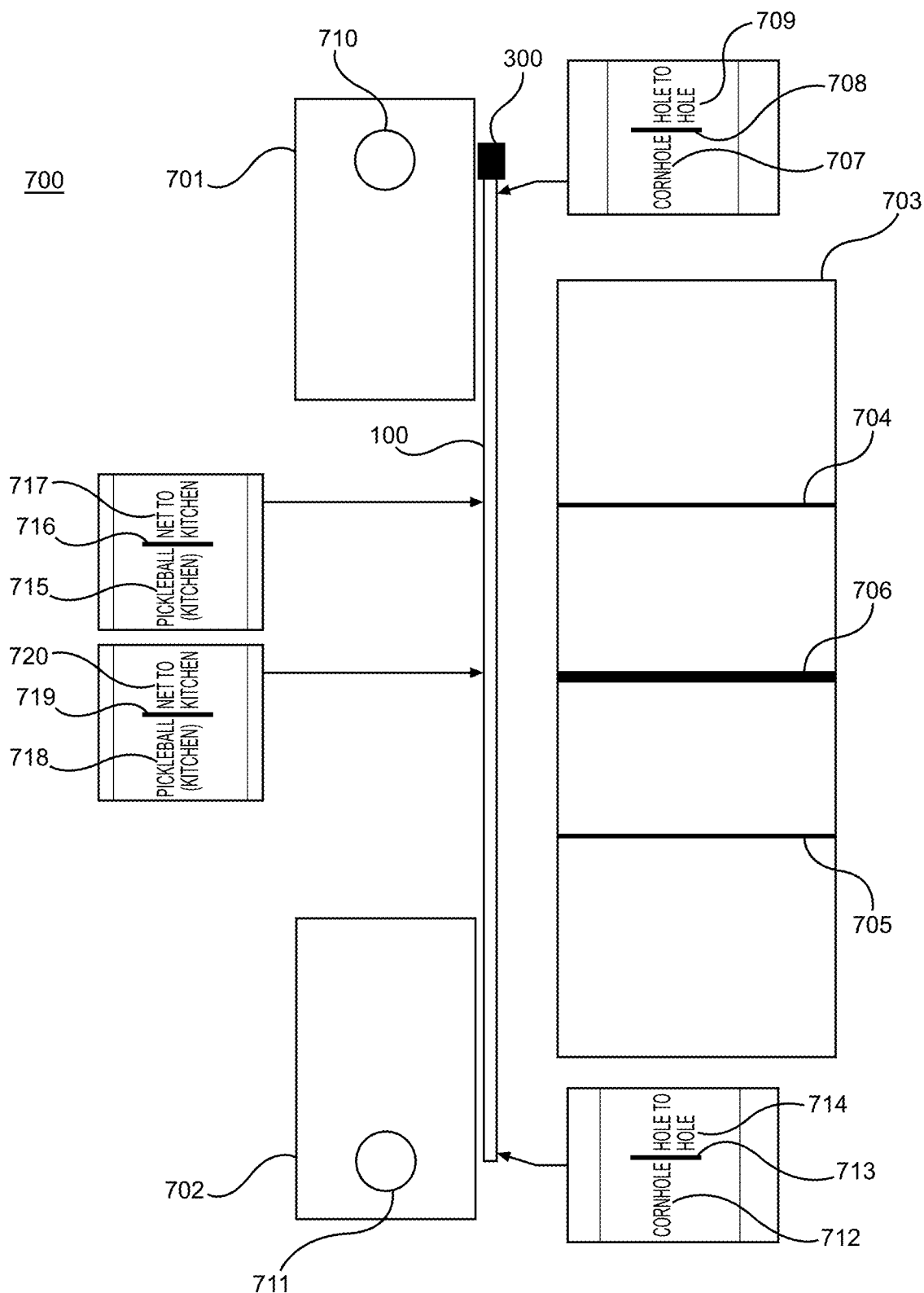
FIG. 7 illustrates a plan view of a measuring system attached to a game platform via the attachable docking clip in accordance with one embodiment.

Referring now to FIG. 7, in the depicted exemplary embodiment, a field or space for game play 700 is occupied by an upper cornhole platform 701, a lower cornhole platform 702, and a pickleball court 703. The pickleball court 703 includes an upper boundary of the kitchen/non-volley zone 704, a pickleball net 706 and a lower boundary of the kitchen/non-volley zone 705.

The measuring system 300 is positioned adjacent to the upper cornhole platform 701, whereby the measuring device 100 is extended, showing a magnified first cornhole non-numerical game indicia 707, a first cornhole mark 708, and a first cornhole non-numerical game component indicia 709. The first cornhole non-numerical game indicia 707 indicates the sport of cornhole, the first cornhole mark 708 indicates the point to align the measuring device 100 to an upper cornhole platform hole 710, and the first cornhole non-numerical game component indicia 709 indicates a defined distance of the upper cornhole platform hole 710 to a lower cornhole platform hole 711. The extended measuring device 100 shows the first cornhole mark 708 is configured to align with the upper cornhole platform hole 710.

Along the length of the extended measuring device 100, a magnified second cornhole non-numerical game indicia 712, a second cornhole mark 713, and second cornhole non-numerical game component indicia 714, reaches the lower cornhole platform 702. The second cornhole mark 713 aligns with the lower cornhole platform hole 711.

The second cornhole non-numerical game indicia 712 indicates the sport of cornhole, the second cornhole mark 713 indicates the point to align the measuring device 100 to the lower cornhole platform hole 710 of the lower cornhole platform 702, and the second cornhole non-numerical game component indicia 712 indicates a defined distance of the upper cornhole platform hole 710 to the lower cornhole platform hole 711. The first cornhole mark 708 and second cornhole mark 713 on the measuring device 100 thus provide an indication of the predefined distance between the upper cornhole platform hole 710 and lower platform hole 711 respectively. Therefore, users may use the measuring device 100 in this example to accurately and quickly determine the defined distance from the upper cornhole platform hole 710 to the lower cornhole platform hole 711, without referring to official rules associated with cornhole or otherwise knowing the defined distance.

FIG. 7 also depicts the extended measuring device 100 having a first pickleball non-numerical game indicia 715, a first pickleball mark 716, and a first pickleball non-numerical game component indicia 717. The first pickleball non-numerical game indicia 715 indicates the sport of pickleball, and in particular a kitchen area/non-volley zone of a pickleball court. The first pickleball mark 716 indicates the point to align the measuring device 100 to an upper boundary of the kitchen/non-volley zone 704. The first pickleball non-numerical game component indicia 717 indicates a first point of a defined distance from the upper boundary of the kitchen/non-volley zone 704 to the pickleball net 706.

The measuring device 100 is extended also showing a magnified second pickleball non-numerical game indicia 718, a second pickleball mark 719, and a second pickleball non-numerical game component indicia 720. The second pickleball non-numerical game indicia 718 indicates the sport of pickleball, and in particular the kitchen area/non-volley zone of a pickleball court. The second pickleball mark 719 indicates the point to align the measuring device 100 to the pickleball net 706. The second pickleball non-numerical game component indica 720 indicates a second point of a defined distance from the upper boundary of the kitchen/non-volley zone 704 to the pickleball net 706. The distance between the first pickleball mark 716 and the second pickleball mark 719 indicates the predefined distance from the upper boundary of the kitchen/non-volley zone 704 to the pickleball net 706, e.g., as specified in official pickleball rules or regulations. The first pickleball mark 716 and second pickleball mark 719 on the measuring device 100 thus provide an indication of the predefined distance between the upper boundary of the kitchen/non-volley zone 704 and the pickleball net 706. Users may thus use the first pickleball mark 716 and second pickleball mark 719 on the measuring device 100 in this example to accurately and quickly determine the defined distance between the upper boundary of the kitchen/non-volley zone 704 and the pickleball net 706.

The first pickleball mark 716 and the second pickleball mark 719 may also be used to measure the defined distance between the pickleball net 706 and the lower boundary of the kitchen/non-volley zone 705 of the pickleball court 703. Users may thus use the first pickleball mark 716 and second pickleball mark 719 on the measuring device 100 in this example to accurately and quickly determine the defined distance between the lower boundary of the kitchen/non-volley zone 705 and the pickleball net 706, without referring to official rules associated with pickleball or otherwise knowing the defined distance.

The measuring device 100 provides users a more seamless method of preparation for a game as users no longer need to reference a separate source to determine the numerical distances between each game component, and then have to measure each individual distance for each component. Rather, the source and measuring tool is combined for a more efficient process.

The measuring device 100 may include non-numerical game indicia 302, a mark 303, and non-numerical game component indicia 304, or any combination thereof, for one or more games including, but not limited to, pickleball, darts, molkky, bean bag bucketz, kubb, bulzibucket, ladderball, quoits, washer toss, paddleball, bucket ball, cornhole, cornhole junior, bottle break, wiffle ball, lawn darts, fowling, horseshoes, and kan jam.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Reference to an element in the singular is not intended to mean "one and only one" unless specifically so stated, but rather "one or more." As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus.

The benefits, advantages and solutions to problems described herein with regard to one or more embodiments are merely exemplary and are not required or exclusive. Any benefit, advantage, solution to a problem, or any element that may cause any particular benefit, advantage, or solution to occur or to become more pronounced are not to be construed as critical, required, or essential features or components of any or all embodiments in the claims.

We claim:

1. A measuring device, comprising:
   at least one first mark on a measuring component, wherein the at least one first mark on the measuring component indicates a first defined distance for at least one first game component of at least one first game;
   at least one first game indicia, wherein the first game indicia identifies the at least one first game;
   at least one first game component indicia, wherein the first game component indicia identifies the at least one first game component of the at least one first game;
   a second mark on the measuring component, wherein the second mark on the measuring component indicates a second defined distance for at least one second game component of a second game;
   a second game indicia, wherein the second game indicia identifies the second game; and
   a second game component indicia, wherein the second game component indicia identifies the at least one second game component of the second game.

2. The measuring device according to claim 1, wherein the at least one first mark is positioned at the first defined distance for the at least one game component of the at least one first game from a starting portion of the measuring component.

3. The measuring device according to claim 1, further comprising:
   at least one corresponding mark on the measuring component, wherein a distance between the at least one first mark and the at least one corresponding mark on the measuring component is the first defined distance for the at least one first game component of the at least one first game.

4. The measuring device according to claim 1, wherein the at least one first game identified by the first game indicia includes at least one of: pickleball, darts, molkky, bean bag bucketz, kubb, bulzibucket, ladderball, quoits, washer toss, paddleball, bucket ball, cornhole, cornhole junior, bottle break, wiffle ball, lawn darts, fowling, horseshoes, and kan jam.

5. The measuring device according to claim 1, wherein the at least one first game component identified by the at least one first game component indicia includes at least one of: a distance between sidelines, boundaries, goal posts, playing areas, platforms, or other defined areas of a court or game.

6. The measuring device according to claim 1, wherein the measuring device is equipped with a lateral projection or hook on a starting end of the measuring device.

7. The measuring device of claim 1, further comprising:
   a third mark on the measuring component, wherein the third mark on the measuring component indicates a third defined distance for at least one third game component of a third game;
   a third game indicia, wherein the third game indicia identifies the third game; and
   a third game component indicia, wherein the third game component indicia identifies the at least one third game component of the third game.

8. A measuring system, comprising:
   a measuring device including:
     at least one first mark on the measuring device, wherein the at least one first mark on the measuring device indicates a first defined distance for at least one first game component of at least one first game;
     at least one first game indicia, wherein the first game indicia identifies the at least one first game; and
     at least one first game component indicia, wherein the first game component indicia identifies the at least one first game component of the least one first game;
     a second mark on the measuring component, wherein the second mark on the measuring component indicates a second defined distance for at least one second game component of a second game;
     a second game indicia, wherein the second game indicia identifies the second game;
     a second game component indicia, wherein the second game component indicia identifies the at least one second game component of the second game; and
   a housing assembly, wherein the measuring device may be extended from and retracted into the housing assembly.

9. The measuring system according to claim 8, wherein the at least one first mark is positioned at the first defined distance for the at least one first game component of the at least one first game from a starting portion of the measuring device.

10. The measuring system according to claim 8, further comprising:
    at least one corresponding mark on the measuring device, wherein a distance between the at least one first mark and the at least one corresponding mark on the measuring device is the first defined distance for the at least one first game component of the at least one first game.

11. The measuring system according to claim 8, wherein the at least one first game identified by the first game indicia includes at least one of: pickleball, darts, molkky, bean bag bucketz, kubb, bulzibucket, ladderball, quoits, washer toss, paddleball, bucket ball, cornhole, cornhole junior, bottle break, wiffle ball, lawn darts, fowling, horseshoes, and kan jam.

12. The measuring system according to claim 8, wherein the at least one first game component identified by the at least first game component indicia includes at least one of: a distance between sidelines, boundaries, goal posts, playing areas, platforms, or other defined areas of a court or game.

13. The measuring system according to claim 8, further comprising:
   an attachable mounting component configured to mount the measuring device to a game platform.

14. The measuring system according to claim 8, further comprising:
   an integrated bottle opener.

15. The measuring system according to claim 8, further comprising:
   an integrated two team score keep.

16. The measuring system according to claim 8, the measuring device further comprising:
   a third mark on the measuring component, wherein the third mark on the measuring component indicates a third defined distance for at least one third game component of a third game;
   a third game indicia, wherein the third game indicia identifies the third game; and
   a third game component indicia, wherein the third game component indicia identifies the at least one third game component of the third game.

\* \* \* \* \*